United States Patent
Minieri

[11] 3,730,954
[45] May 1, 1973

[54] N-(SUBSTITUTED INDAZOLYL-N¹-METHYL)HEXAMETHYLENETETRAAMMONIUM HALIDES

[75] Inventor: Pasquale Paul Minieri, Woodside, N.Y.

[73] Assignee: Tenneco Chemicals, Inc., New York, N.Y.

[22] Filed: Nov. 22, 1971

[21] Appl. No.: 201,178

[52] U.S. Cl............260/248.5, 260/45.8 N, 424/249
[51] Int. Cl. .............................................C07d 55/52
[58] Field of Search....................260/248.5

[56] References Cited

UNITED STATES PATENTS 2,891,060 6/1959 Rudner............................260/248.5
3,669,987 6/1972 Sato et al.....................260/248.5 X

*Primary Examiner*—John M. Ford
*Attorney*—Daniel J. Reardon et al.

[57] ABSTRACT

Compounds that have the structural formula

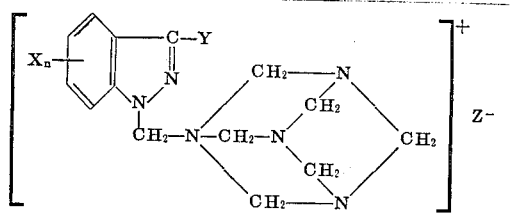

wherein X represents halogen, nitro, amino, acetamino, or (halobenzylidene)amino; Y represents hydrogen or halogen; Z represents halogen; and n represents an integer in the range of zero to 2 are used to control the growth of bacteria, fungi, and other microorganisms. Illustrative of these compounds is N-(6-nitroindazolyl-N¹-methyl)hexamethylenetetraammonium chloride.

10 Claims, No Drawings

N-(SUBSTITUTED INDAZOLYL-N - METHYL)HEXAMETHYLENETETRAAMMONIUM HALIDES

This invention relates to N-(substituted indazolyl-$N^1$-methyl)hexamethylenetetraammonium halides. It further relates to the use of these compounds as biocides in surface-coating compositions.

In accordance with this invention, it has been found that certain N-(substituted indazolyl-$N^1$-methyl)hexamethylenetetraammonium halides are useful as fungicides and as bactericides. These compounds may be represented by the structural formula

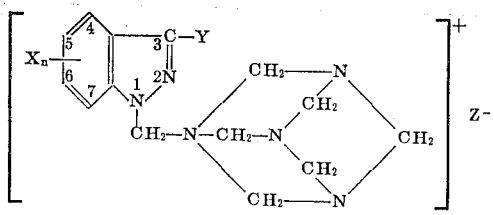

wherein X represents chlorine, bromine, fluorine, iodine, nitro, amino, acetamino, (chlorobenzylidene)amino, or (bromobenzylidene)-amino; Y represents hydrogen, chlorine, bromine, fluorine, or iodine; Z represents chlorine, bromine, fluorine, or iodine; and n represents an integer in the range of zero to 2. Illustrative of these compounds are the following: N-(3-bromoindazolyl-$N^1$-methyl)hexamethylenetetraammonium bromide, N-(6-acetaminoindazolyl-$N^1$-methyl)hexamethylenetetraammonium iodide, N-[6-(3,4-dichloro-benzylidene)aminoindazolyl-$N^1$-methyl]hexamethylenetetraammonium chloride, N-(4-iodoindazolyl-$N^1$-methyl)hexamethylenetetraammonium iodide, N-(3,5,6-trichloroindazolyl-$N^1$-methyl)hexamethylenetetraammonium chloride, and the like.

Particularly effective as biocides are the compounds represented by the structural formula

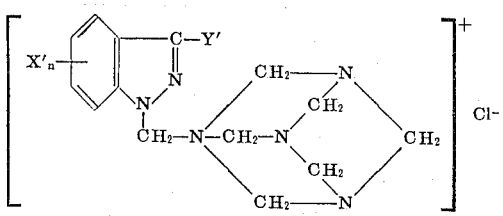

wherein X' represents chlorine or nitro, Y' represents hydrogen or chlorine, and n represents an integer in the range of zero to 2. Examples of these preferred compounds include N-(3-chloroindazolyl-$N^1$-methyl)hexamethylenetetraammonium chloride, N-(5-chloroindazolyl-$N^1$-methyl)hexamethylenetetraammonium chloride, N-(3,5-dichloroindazolyl-$N^1$-methyl)hexamethylenetetraammonium chloride, N-(3-chloro-5-nitroindazolyl-$N^1$-methyl)hexamethylenetetraammonium chloride, and N-(5,6-dinitroindazolyl-$N^1$-methyl)hexamethylenetetraammonium chloride.

The novel compounds of this invention may be prepared by any suitable and convenient procedure. For example, they may be prepared by heating the appropriate $N^1$-halomethyl-substituted-indazole with hexamethylenetetramine. The reaction is usually carried out in a solvent, such as chloroform, carbon tetrachloride, or ethylene dichloride, at the reflux temperature of the reaction mixture. The $N^1$-halomethyl-substituted-indazoles may be prepared by the procedure described in my copending application Ser. No. 589,235, which was filed on Oct. 25, 1966.

The compounds of this invention can be used to control the growth of a wide variety of microorganisms. They are of particular value as biocides in surface-coating compositions that contain as their resinous binder a water-insoluble synthetic linear addition polymer or an oleoresinous binder.

In a preferred embodiment of the invention the novel quaternary ammonium halides are used as biocides in aqueous dispersions that contain about 10 to 60 percent by weight of a water insoluble linear addition polymer and/or an oleoresinous binder. The aqueous dispersions of synthetic linear addition polymers are ordinarily prepared by the emulsion polymerization of ethylenically-unsaturated compounds, especially those of monoethylenically-unsaturated character, although butadiene, chlorobutadiene, and isoprene may be used to some extent. Illustrative of the synthetic linear addition polymers that can be used as the resinous binder in the aqueous dispersions are polyvinyl acetate; polyvinyl butyrate; polyvinyl chloride; copolymers of vinyl acetate with acrylonitrile; copolymers of vinyl chloride with vinylidene chloride; polyethylene; polyisobutylene; polystyrene; copolymers of styrene with butadiene; copolymers of acrylonitrile with butadiene; copolymers of methacrylic acid esters of alcohols having one to eight carbon atoms with vinyl acetate, vinyl chloride, acrylonitrile, or styrene; copolymers of acrylic acid esters of alcohols having one to eight carbon atoms with vinyl acetate, vinyl chloride, acrylonitrile, or styrene; copolymers of styrene with maleic anhydride; and mixtures thereof. Suitable oleoresinous binders include drying oils, such as linseed oil, tung oil, soybean oil, dehydrated castor oil, safflower oil, or fish oil, bodied drying oils; blends of drying oils or bodied drying oils with a resin component such as limed rosin, an ester gum, or phenolic resin; oleoresinous varnishes formed by heating one of the aforementioned resins with one or more drying oils or bodied drying oils; alkyd resins, which are resinous products resulting from the reaction of a polyhydric alcohol, such as pentaerythritol or glycerol, with a dicarboxylic acid, such as phthalic anhydride, and fatty acids; and mixtures thereof.

In another preferred embodiment of the invention, the novel compounds are used as the biocide in solvent-based systems that contain an oleoresinous binder as hereinbefore defined. Only a small concentration of the biocidal compound need be present in the surface coating-compositions. As little as 0.10 percent of one or more of these compounds, based on the weight of the composition, will bring about an appreciable improvement in the resistance of the composition to attack by microorganisms. Approximately 5.0 percent or more of the biocidal compound, based on the weight of the composition, can be used, but these larger amounts generally do not provide further improvement in the properties of the surface-coating compositions and for this reason are not ordinarily used. While the amount of the biocide that will provide optimum protection for the surface-coating compositions depends upon such factors as the choice of biocidal compound, the choice of resinous binder and other compounds of the composition, the amount of each that is employed and the application for which the coating composition is intended, in most cases about 0.25 percent to 2.0 percent of the biocidal compound, based on the weight of the surface-coating composition, is used.

In addition to the resinous binder and the quaternary ammonium halide, the surface-coating compositions of this invention may contain various auxiliary materials, such as pigments, extenders, solvents, dyes, defoaming agents, driers, emulsifying agents, dispersing agents, plasticizers, and the like in the amounts ordinarily used for these purposes.

The compounds of this invention may be incorporated into the surface-coating composition by any convenient procedure. For example, they can be combined with pigments and various other components to form a pigment phase that is then mixed with the resinous binder and water or an organic solvent to form the surface-coating composition. Alternatively, they can be added to a composition that contains the resinous binder, pigment, and water or organic solvent. The biocidal compound can be added as such to the other components of the surface-coating composition, or they can be added as a solution in an alcohol, ether, ketone or other solvent.

The invention is further illustrated by the following examples.

EXAMPLE 1

A mixture of 100 ml. of chloroform, 11.0 grams (0.08 mole) of hexamethylenetetramine, and 16.6 grams (0.08 mole) of N'-chloromethyl-6-nitroindazole was heated at its reflux temperature for 2 hours and then cooled to 5°C. The product was isolated by filtration and then washed with cold chloroform. The combined filtrate and chloroform washings were evaporated to one-third of the original volume and then filtered. The two crops of N-(6-nitroindazolyl-N$^1$-methyl)hexamethylenetetraammonium chloride were combined and dried at 60°. under reduced pressure. There was obtained an 83.3 percent yield of N-(6-nitroindazolyl-N$^1$-methyl)hexamethylenetetraammonium chloride, which melted at 207°–209°C. and which contained 10.8% Cl and 26.3% N (calculated, 10.1% Cl and 27.7% N). The structure of the compound was confirmed by its infrared spectrum.

EXAMPLE 2

A mixture of 150 ml. of carbon tetrachloride, 7.8 grams (0.055 mole) of hexamethylenetetramine, and 13.7 grams (0.056 mole) of N$^1$-chloromethyl-3-chloro-6-nitroindazole was heated at its reflux temperature for 2 hours and then cooled to 5°C. The product was isolated by filtration, washed with 25 ml. of cold carbon tetrachloride, and dried at 60°C. under reduced pressure. There was obtained a 94.8 percent yield of N-(3-chloro-6-nitroindazolyl-N$^1$-methyl)hexamethylenetetraammonium chloride, which melted at 188°–190°C. and which contained 44.1% C, 4.73% H, 24.3% N, and 18.6% Cl (calculated, 43.4% C, 4.65% H, 25.3% N, and 18.3% Cl). The structure of the compound was confirmed by its infrared spectrum.

EXAMPLES 3–6

A series of N-(substituted indazolyl-N$^1$-methyl)hexamethylenetetraammonium chlorides was prepared by the procedure described in Example 2. The compounds prepared and their properties are given in Table 1.

TABLE 1

| Ex. N. | Compound | Yield (%) | M. P. (°C.) | Analysis (Calculated) |
|---|---|---|---|---|
| 3 | N-(3-chloroindazolyl-N$^1$-methyl)hexamethylenetetraammonium chloride | 79.5 | 175°–186° | |
| 4 | N-(5-chloroindazolyl-N$^1$-methyl)hexamethylenetetraammonium chloride | 46 | 201°–208° | 42.7% C(41.7) 5.9% H(5.3) 24.6% N(24.6) 21.8% Cl(20.8) |
| 5 | N-(3-chloro-5-nitroindazolyl-N$^1$-methyl)hexamethylenetetraammonium chloride | 81.8 | 194°–197° | |
| 6 | N-(5,6-dinitroindazolyl-N$^1$-methyl)hexamethylenetetraammonium chloride | 91.8 | 64° (dec.) | |

EXAMPLE 7

A. A polyvinyl acetate emulsion paint was prepared by mixing together the following materials:

| | Parts by Weight |
|---|---|
| Water | 280 |
| Potassium pyrophosphate | 3 |
| Calcium metasilicate | 135 |
| Titanium dioxide (rutile) | 220 |
| Aqueous solution of methylcellulose (2%) | 200 |
| Diethyl ether of diethylene glycol | 37 |
| Aqueous dispersion containing 55% by weight of polyvinyl acetate | 350 |

To samples of this paint was added 2 percent by weight of one of the compounds of this invention or a comparative biocide.

B. An acrylic paint was prepared by mixing together the following materials:

| | Parts by Weight |
|---|---|
| Titanium dioxide | 1136.0 |
| Mica (325 mesh waterground) | 136.0 |
| Calcium carbonate | 568.0 |
| Water | 699.0 |
| 2% Aqueous solution of sodium salt of maleic anhydride/diisobutylene copolymer (Tamol 731) | 41.0 |
| Alkyl aryl polyether surfactant (Triton CF-10) | 9.0 |
| Antifoam agent (Colloid 581B) | 18.0 |
| Ethylene glycol | 91.0 |
| Hydroxyethyl cellulose (Cellosize QP 4400) | 9.1 |
| Ammonium hydroxide (28% aqueous solution) | 9.0 |
| Aqueous dispersion containing 43% by weight of the ammonium salt of a copolymer of 66% by weight of ethyl acrylate, 32.5% by weight of methyl methacrylate, and 1.5% by weight of acrylic acid containing 3% by weight of tert. octylphenoxypolyethoxyethanol | 2486.0 |

To samples of this paint was added 2 percent by weight of either one of the compounds of this invention or a comparative biocide.

C. The polyvinyl acetate and acrylic paints were evaluated by the following procedure: Pieces of drawdown paper were dipped into the paint, dried for 24 hours, and again dipped into the paint. After a 24 hour drying period, the coated paper samples were cut into 1¼ inch squares. Each of the coated paper squares was placed on a plate of malt and mycophil agar, which had been inoculated with 1 ml. of the test organism. The plates, prepared in triplicate, were incubated at 28°C. and observed weekly. The growth was estimated, and the results of the triplicate plates were averaged. The biocidal compounds and the results obtained are given in Table II. In this table ZO = Zone of inhibition in mm.
Tr = Trace zone of inhibition
— — — = Not tested
Bacteria A
— Mixed inoculum consisting of *P. aeruginsoa* ATCC 10145, *A. aerogenes* ATCC 7256, and three unidentified strains of Bacillus
B — *Bacillus subtilis*
C — *Aerobacter aerogenes*
D— *Pseudomonas aeruginsoa*
Fungi
E— *Pullularia pullulans*
F — *Penicillium crustosum*
G — *Aspergillus Niger* wherein X represents halogen, nitro, amino, acetamino, or (halobenzylidene)amino; Y represents hydrogen or halogen; Z represents halogen; and n represents an integer in the range of zero to 2.

2. A compound as set forth in claim 1 that has the structural formula

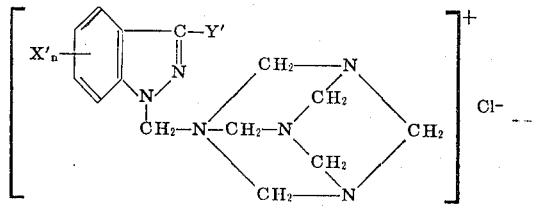

wherein X' represents chlorine or nitro; Y' represents hydrogen or chlorine; and n represents an integer in the range of zero to 2.

3. A compound as set forth in claim 2 wherein X' is nitro and n is 1.

TABLE II

| Biocide | Paint | Effect on Paint | | Bacteria | | | | Fungi | | |
|---|---|---|---|---|---|---|---|---|---|---|
| | | pH | Color | A | B | C | D | E | F | G |
| Product of Example 1 | Acrylic | 7.2 | Yellow | ZO-4 | ZO-8 | ZO-2 | Tr | Tr | ZO-1 | Tr |
| | PVA | 6.3 | Beige | ZO-12 | ZO-11 | ZO-7 | ZO-5 | ZO-6 | ZO-5 | ZO-2 |
| Product of Example 3 | Acrylic | 8.2 | Off-white | ZO-2 | ZO-5 | Tr | ZO-4 | ZO-1 | ZO-2 | Tr |
| | PVA | 6.6 | do | ZO-10 | ZO-8 | ZO-5 | | | | |
| Product of Example 5 | Acrylic | 7.1 | Off-white | ZO-9 | ZO-9 | ZO-5 | ZO-1 | ZO-2 | Tr | ZO-2 |
| | PVA | 6.4 | do | ZO-12 | ZO-10 | ZO-5 | ZO-6 | ZO-2 | ZO-5 | Tr |
| Product of Example 6 | Acrylic | 8.8 | Beige | ZO-1 | ZO-1 | | | | | |
| | PVA | 7.0 | do | ZO-5 | ZO-5 | Tr | Tr | ZO-9 | ZO-1 | ZO-10 |
| Bis(phenylmercury)dodecenyl-succinate (Super Ad-It) | Acrylic | 8.5 | Off-white | | ZO-9 | | | ZO-6 | ZO-17 | ZO-6 | ZO-10 |
| | PVA | 6.9 | do | | ZO-10 | ZO-2 | ZO-7 | | | |

Each of the other N-(substituted indazolyl-N¹-methyl)hexamethylenetetraammonium halides disclosed herein can be used in a similar way to control the growth of microorganisms in surface-coating systems.

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

What is claimed is:

1. A compound having the structural formula

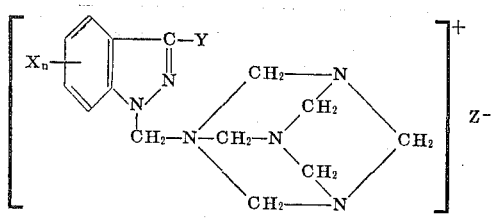

4. A compound as set forth in claim 2 wherein X' is chlorine and n is 1.

5. The compound as set forth in claim 2 that is N-(3-chloroindazolyl-N¹-methyl)hexamethylenetetraammonium chloride.

6. The compound as set forth in claim 2 that is N-(6-nitroindazolyl-N¹-methyl)hexamethylenetetraammonium chloride.

7. The compound as set forth in claim 2 that is N-(3-chloro-6-nitroindazolyl-N¹-methyl)hexamethylenetetraammonium chloride.

8. The compound as set forth in claim 2 that is N-(5-chloroindazolyl-N¹-methyl)hexamethylenetetraammonium chloride.

9. The compound as set forth in claim 2 that is N-(3-chloro-5-nitroindazolyl-N¹-methyl)hexamethylenetetraammonium chloride.

10. The compound as set forth in claim 2 that is N-(5,6-dinitroindazolyl-N¹-methyl)hexamethylenetetraammonium chloride.

* * * * *